United States Patent
Hashemi et al.

(10) Patent No.: US 11,046,323 B2
(45) Date of Patent: Jun. 29, 2021

(54) ARCHITECTURE AND RECONFIGURABLE TIRE FORCE ESTIMATION FOR VARIOUS POWERTRAIN CONFIGURATIONS

(71) Applicants: GM Global Technology Operations LLC, Detroit, MI (US); University of Waterloo, Waterloo (CA)

(72) Inventors: Ehsan Hashemi, Waterloo (CA); SeyedAlireza Kasaiezadeh Mahabadi, Shelby Township, MI (US); Amir Khajepour, Waterloo (CA); Xueying Kang, Novi, MI (US); Jin-Jae Chen, Canton, MI (US); Hualin Tan, Novi, MI (US); James H. Holbrook, Fenton, MI (US); Bakhtiar B. Litkouhi, Washington, MI (US)

(73) Assignees: GM Global Technology Operations LLC, Detroit, MI (US); University of Waterloo, Waterloo (CA)

( * ) Notice: Subject to any disclaimer, the term of this patent is extended or adjusted under 35 U.S.C. 154(b) by 162 days.

(21) Appl. No.: 16/374,160

(22) Filed: Apr. 3, 2019

(65) Prior Publication Data
US 2020/0317198 A1 Oct. 8, 2020

(51) Int. Cl.
    *B60W 30/18*     (2012.01)
    *B60W 40/068*     (2012.01)
    *B60W 50/00*     (2006.01)

(52) U.S. Cl.
CPC .... *B60W 30/18172* (2013.01); *B60W 40/068* (2013.01); *B60W 50/00* (2013.01); *B60W 2050/0052* (2013.01); *B60W 2520/105* (2013.01); *B60W 2520/125* (2013.01); *B60W 2520/14* (2013.01); *B60W 2520/28* (2013.01); *B60W 2520/30* (2013.01); *B60W 2552/15* (2020.02)

(58) Field of Classification Search
CPC ......... B60W 2520/14; B60W 2520/28; B60W 2520/30; B60W 2520/105; B60W 2520/125
See application file for complete search history.

(56) References Cited

U.S. PATENT DOCUMENTS

| | | | |
|---|---|---|---|
| 9,752,962 B2 | 9/2017 | Singh | |
| 2006/0201240 A1 | 9/2006 | Morinaga | |
| 2007/0106443 A1* | 5/2007 | Lu | B60T 8/1755 701/70 |

(Continued)

FOREIGN PATENT DOCUMENTS

| | | |
|---|---|---|
| DE | 3535090 A1 | 4/1987 |
| JP | 2007191041 A | 8/2007 |

*Primary Examiner* — Imran K Mustafa
(74) *Attorney, Agent, or Firm* — Quinn IP Law

(57) ABSTRACT

A method for estimation of a vehicle tire force includes: receiving, by a controller of a vehicle, a measured vehicle acceleration of the vehicle; receiving, by the controller, a measured wheel speed and a measured yaw rate of the vehicle; forming, by the controller, inertia matrices based on an inertia of rotating components of the vehicle; calculating torques at corners of the vehicle using the inertia matrices; estimating tire forces of the vehicle based on the measured vehicle acceleration, the measured wheel speed, and the inertia matrices; and controlling, by the controller, the vehicle, based on the plurality of estimated longitudinal and lateral tire forces.

20 Claims, 3 Drawing Sheets

(56) References Cited

U.S. PATENT DOCUMENTS

| | | | | |
|---|---|---|---|---|
| 2008/0071451 A1* | 3/2008 | Yamaguchi | ........... | B60W 10/08 |
| | | | | 701/69 |
| 2009/0177346 A1* | 7/2009 | Hac | ................. | B60W 40/13 |
| | | | | 701/31.4 |
| 2010/0299019 A1* | 11/2010 | Igarashi | ................ | B60W 40/12 |
| | | | | 701/31.4 |

\* cited by examiner

ARCHITECTURE AND RECONFIGURABLE TIRE FORCE ESTIMATION FOR VARIOUS POWERTRAIN CONFIGURATIONS

INTRODUCTION

The present disclosure relates methods and systems for vehicle tire force estimation and, more particularly to an architecture and reconfigurable tire force estimation for various powertrain configurations.

Exiting tire force estimation methods are tire-based or torque-based. The estimations method may provide inaccurate results due to uncertainties in tire model parameters and variations in road friction. Therefore, there is a need for a robust tire force estimation method.

SUMMARY

Tire force estimation is useful for most of the controls and diagnostics methodologies. One of the challenges for the existing algorithms is the sensitivity to the road surface condition. The other difficulty is how to handle different driveline configurations with totally different actuation systems. This presently disclosed method addresses the issues mentioned above in a robust manner.

The present disclosure describes a reconfigurable algorithm for estimation of tire longitudinal and lateral tire forces at each corner of a vehicle that is proposed and tested on different roads and under various driving conditions. The presently disclosed algorithm is independent from the road condition and may be used for different configurations of AWD, RWD, or FWD. The estimation method may be used for various actuation/transmission types, i.e., Electronic Limited Slip Differential (eLSD), open differentials, electric motors, gasoline engines, etc. The presently disclosed method estimates longitudinal and lateral tire force without requiring extra or uncommon vehicle sensors for different AWD/FWD/RWD driveline configurations. The road friction condition is not required for the algorithm. The presently disclosed method is also reconfigurable for different actuation/transmission types, i.e., eLSD, open differential, electric motor, gasoline engines, etc. The presently disclosed method provides good estimation outcomes in drift maneuvers as well as lane-change, harsh steering, and more specifically combined-slip maneuvers. The presently disclosed method considers driving conditions for more accurate and reliable estimation at each corner. Accelerators in vehicles may generate noises, and the signals generated by accelerometers may fluctuate. The presently disclosed method is robust to the accelerometers' noises and fluctuations. The presently disclosed method is robust to the tire parameter changes (changes due to wear, aging and temperature changes has no effect on the longitudinal and lateral tire force estimation). The presently disclosed method employs slip/excitation monitoring time windows to remove outliers in different driving conditions. The presently disclosed method lowers computational complexity compared to existing approaches. By employing this method, the tire fore estimate may be used to significantly improve the performance of the vehicle motion.

An integrated method for estimation of vehicle (longitudinal and lateral) tire forces includes receiving, by a controller of a vehicle, a measured vehicle acceleration of the vehicle; receiving, by a controller, a measured yaw rate of the vehicle; receiving, by the controller, a measured wheel speed of the vehicle; forming, by the controller, inertia matrices based on an inertia of rotating components of the vehicle based on the measured wheel speed and the measured vehicle acceleration; calculating torques at corners of the vehicle using the inertia matrices and the torque generated by an engine (or electric motor) by various differential configurations, including open differential and eLSD; estimating tire forces of the vehicle based on the measured vehicle acceleration, the measured wheel speed, and the inertia matrices; and controlling, by the controller, the vehicle, based on the plurality of estimated tire forces.

The measured acceleration may be referred to as the measured longitudinal acceleration of the vehicle. The method may further include receiving, by the controller, a measured lateral acceleration of the vehicle. The method may further include receiving, by the controller, a road bank angle and a road grade angle. The method may further include correcting the measured longitudinal acceleration and the measured lateral acceleration using the road grade angle and the road bank angle to determine a corrected longitudinal acceleration of the vehicle and a corrected lateral acceleration of the vehicle. The rotating components may include a plurality of wheels of the vehicle. The plurality of wheels may include a first wheel, a second wheel, a third wheel, and a fourth wheel. The vehicle may include a central drive shaft coupled to the transmission system and an Electronic Limited Slip Differential (eLSD) coupled to the central drive shaft. The eLSD may include a differential case and a clutch coupled to the differential case.

The vehicle may include a first shaft interconnecting the eLSD and the fourth wheel. The vehicle may include a second shaft interconnecting the eLSD and the third wheel. The controller may form the inertia matrices by determining moments of inertia of the differential case and the clutch; and determining moments of inertia of the third wheel and the fourth wheel as a function of the moments of inertia of the differential case and the clutch. The plurality of tires may include a first tire, a second tire, a third tire, and a fourth tire. The torques at the corners of the vehicle may include a first corner torque at the first tire, a second corner torque at the second tire, a third corner torque at the third tire, and a fourth corner torque at the fourth tire. The first corner torque may be calculated as a function of a first brake torque at the first tire. The second corner torque may be calculated as a function of a second brake torque at the second tire. The third corner torque may be calculated as a function of the inertia matrices. The fourth corner torque may be calculated as a function of the inertia matrices.

The method may further include estimating the virtual wheel speed at the corners of the vehicle as a function of the torques at the corners of the vehicle. The method may further include determining longitudinal and lateral tire forces at the corners of the vehicle as a function of the virtual wheel speed, corrected longitudinal/lateral accelerations (by road angles), and measured yaw rate. The method may further include forming augmented state matrices using the virtual wheel speed at the corners of the vehicle and the longitudinal and lateral tire forces at the corners of the vehicle. The method may further include filtering the longitudinal and lateral tire forces at the corners of the vehicle.

The present disclosure further describes a vehicle. The vehicle includes a plurality of rotating components. The plurality of rotating components includes a plurality of tires. The vehicle further includes a transmission system coupled to the plurality of tires and an actuator coupled to the plurality of tires. The vehicle further includes a plurality of sensors and a controller in communication with the plurality of sensors. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
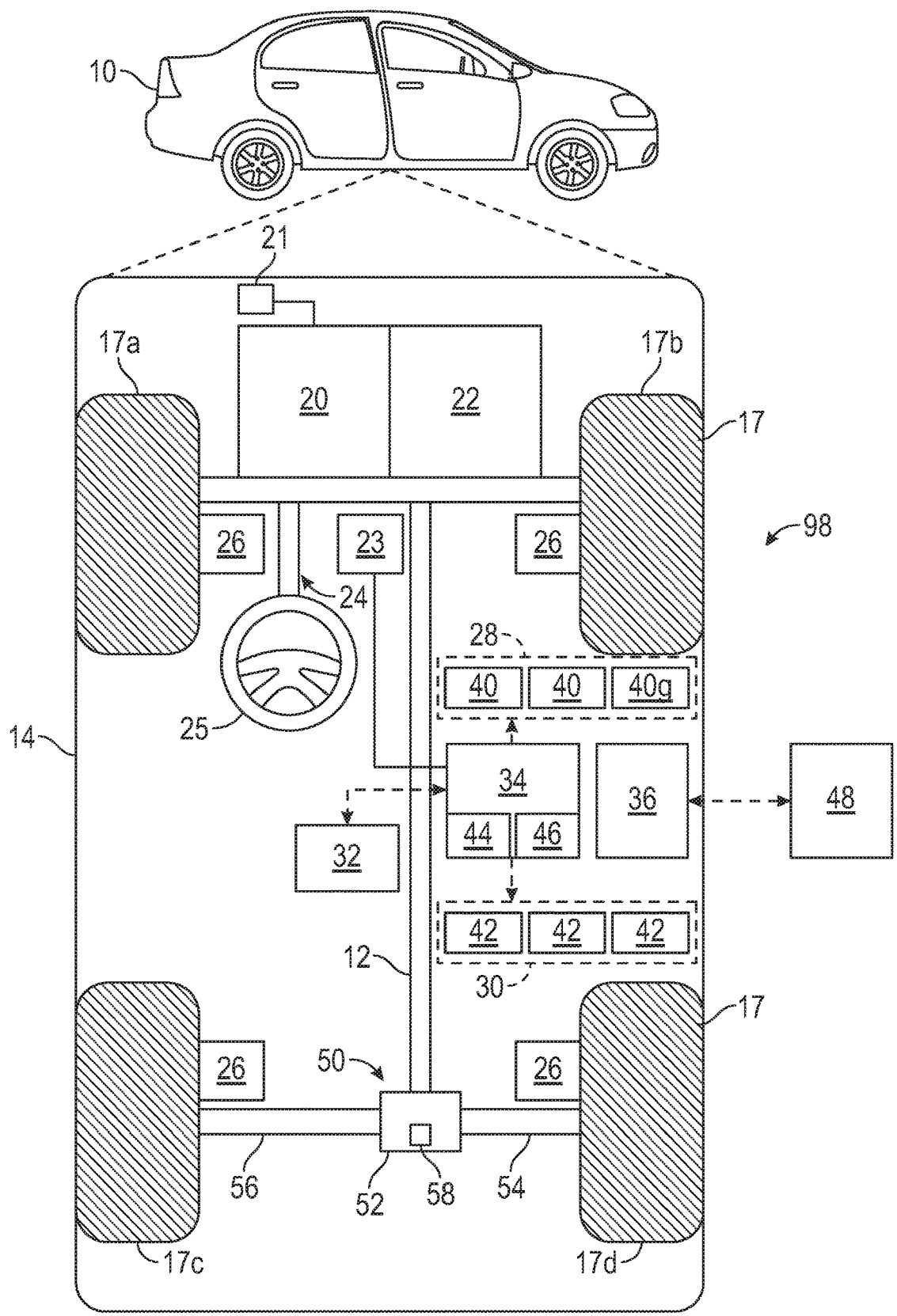
FIG. 1 is a schematic block diagram of a vehicle.

As depicted in FIG. 1, the vehicle 10 generally includes a chassis, a body 14, and front and rear wheels 17. The plurality of wheels includes a first (front-left) wheel 17a, a second (front-right) wheel 17b, a third (rear-left) wheel 17c, and a fourth (rear-right) wheel 17d. The body 14 is arranged on the chassis and substantially encloses components of the vehicle 10. The body 14 and the chassis may jointly form a frame. The wheels 17 are each rotationally coupled to the chassis near a respective corner of the body 14. The vehicle 10 also includes a plurality of rotating components, such as the wheels 17, a central drive shaft 12, a differential case 52 of a differential 50, a first (or right) shaft 54 interconnecting the differential 50 to the fourth wheel 17d, and a second (or left) shaft 56 interconnecting the differential 50 to the third wheels 17c. The central drive shaft 12 transmits torque from the transmission system 22 to the differential 50. The differential 50 may be an open differential or an Electronic Limited Slip Differential (eLSD) and may include the differential case 52 and a clutch 58 coupled to the differential case 52. The differential case 52 may include a rotating rear gear and therefore rotates. During rotation, the differential case transfers torque from the differential 50 to the first shaft 54 and the second shaft 56.

In various embodiments, the vehicle 10 may be an autonomous vehicle and a control system 98 is incorporated into the vehicle 10. The control system 98 may be simply referred to as the system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 may be a partially or fully automated vehicle. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more global positioning systems (GPS) devices, one or more cameras (e.g., optical cameras and/or thermal cameras), ultrasonic sensors, yaw rate sensors, gyroscopes, one or more inertial measurement units (IMUs), one or more steering angle sensor (SAS) for measuring the steering wheel position angle and rate of turn and/or other sensors. The actuator system 30 includes one or more actuator devices 42 that control one or more vehicle features such as, but not limited to, the propulsion system 20, the transmission system 22, the steering system 24 (which includes a steering wheel 25), active aerodynamic devices 60 (FIG. 2), and the brake system 26. In various embodiments, the vehicle features can further include interior and/or exterior vehicle features such as, but are not limited to, doors, a trunk, and cabin features such as air, music, lighting, etc. (not numbered). The sensor system 28 includes one or more Global Positioning System (GPS) devices 40g configured to detect and monitor the route data (i.e., route information). The GPS device 40g is configured to communicate with a GPS to locate the position of the vehicle 10 in the globe. The GPS device 40g is in electronic communication with the controller 34. The GPS device 40g includes a GPS-transmitter to receive data (such as topographical data) from a GPS. The topographical data includes the road grade and road bank angle of the road that the vehicle 10 is on.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

The communication system 36 is in communication with the controller 34 and is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system is configured to wirelessly communicate information I between the vehicle 10 and a second vehicle.

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 is in electronic communication with the controller 34 and may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of one or more wheels 17. The speed sensor (i.e., one of the sensors 40) is coupled to the controller 34 and is in electronic communication with one or more wheels 17.

Figure 2:
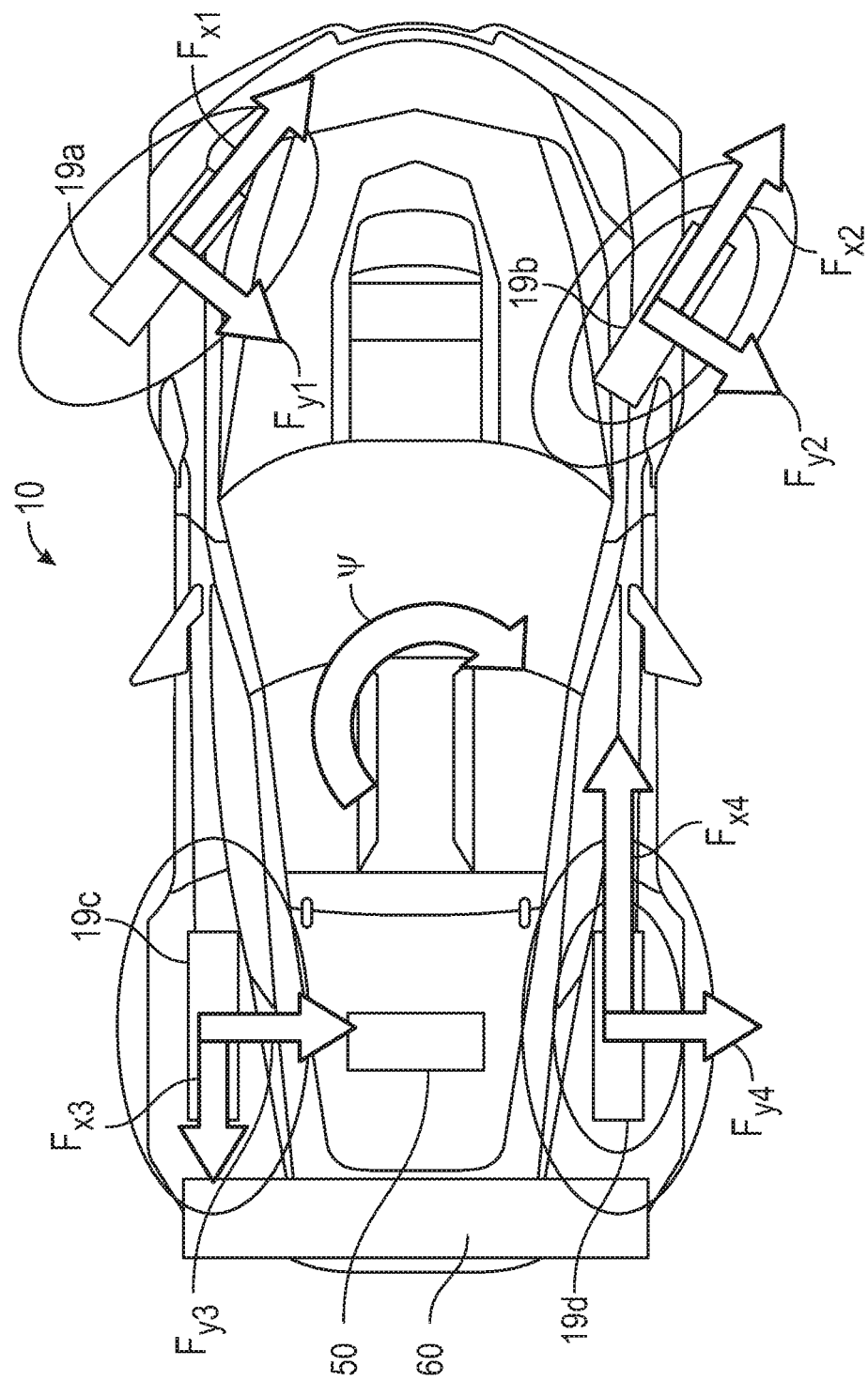
FIG. 2 is a schematic diagram of the vehicle of FIG. 1.

With reference to FIG. 2, the vehicle 10 may include one or more active aerodynamic devices 60. The term "active aerodynamic device" means a physical, tangible structure (such as a spoiler, a wing, air dams, underbody panels, guide vanes, winglets) that is specifically configured to disrupt existing airflow patterns around the vehicle 10 and that is movable relative to the body 14. Each wheel 17 (FIG. 1) is coupled to a tire, such as a first tire 19a (i.e., the front left tire), a second tire 19b (i.e., the front right tire), a third tire 19c (i.e., the rear left tire), and a fourth tire 19d (i.e., the rear right tire). The tires are located at the corners of the vehicle 10. FIG. 2 also illustrates the tire forces (i.e., a first longitudinal tire force $F_{x1}$, a first lateral tire force $F_{y1}$, a second longitudinal tire force $F_{x2}$, a second lateral tire force $F_{y2}$, a third longitudinal tire force $F_{x3}$, a third lateral tire force $F_{y3}$, a fourth longitudinal tire force $F_{x4}$, and a fourth lateral tire force $F_{y4}$, which are also referred to as the forces at corners of the vehicle 10). FIG. 2 also illustrates a yaw direction $\psi$ of the vehicle 10.

Figure 3:
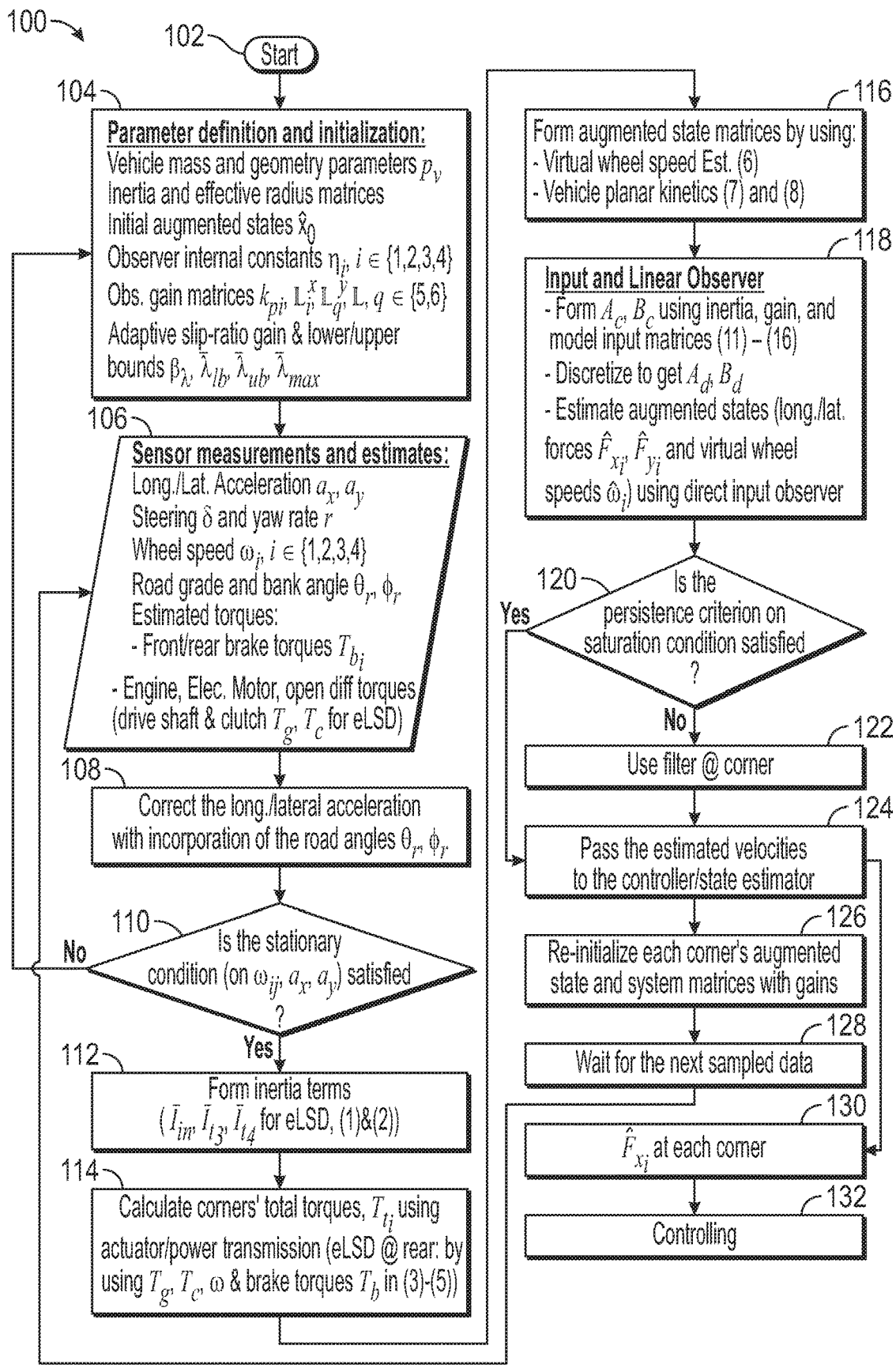
FIG. 3 is a flowchart of a method for tire force estimation.

FIG. 3 is a flowchart of a method 100 for tire force estimation. The method 100 may be executed by the controller 34 and begins at a start block 102. Then, the method 100 proceeds to block 104. Block 104 entails parameters definitions and initialization. The parameters definitions may be stored on non-transitory computer readable storage device or media 46 and may include vehicle mass and geometry parameters $p_v$, inertia and effective radius matrices (including tire effective rolling radius $R_{e_i}$), initial augmented states (tire forces) $\hat{x}_0$ in the state observer, longitudinal force observer's internal constant $\eta\_i$, $i \in \{1,2,3,4\}$, observer gain matrices (such as longitudinal force observer gains at each corner (related to wheel speed) $k_{p_i}$, longitudinal force observer gain matrix at each corner (related to acceleration and yaw rate correction) $\mathbb{L}_i^x$, lateral force observer gain matrix at each corner (related to acceleration and yaw rate correction) $\mathbb{L}_q^y$ $q \in \{5,6\}$. After block 104, the method 100 proceeds to block 106.

At block 106, the controller 34 receives sensor measurements and estimates. For example, at block 106, the controller 34 receives a measured vehicle acceleration of the vehicle 10 as measured by one or more sensors 40 (e.g., accelerometers and/or IMU). Specifically, the controller 34 receives a measured longitudinal acceleration $a_x$ and a measured lateral acceleration $a_y$ of the vehicle 10. The controller 34 also receives a measured steering wheel angle $\delta$ of the steering wheel 25 as measured by one of the sensors 40 (e.g., steering angle sensor). The controller 34 also receives a measured yaw rate r of the vehicle 10 as measured by one or more sensors 40 (e.g., yaw rate sensors, gyroscopes, IMU). The controller 34 also receives a measured wheel speed ($\omega_i$, $i \in \{1,2,3,4\}$) of one or more wheels 17 as measured by one or more of the sensors 40 (e.g., a speed sensor). The controller 34 receives a road grade $\theta_r$ and a bank angle $\phi_r$ of the road that the vehicle 10 is on if available to correct measured longitudinal acceleration $a_x$ and the measured lateral acceleration $a_y$. The controller 34 receives the road grade $\theta_r$ and the bank angle $\phi_r$ from one of the sensors 40 (e.g., GPS device). At block 106, the controller 34 also estimates several torques, including the brake torque at each corner/tire $T_{bi}$, engine torque, electric motor torque, differential torques (such as the central drive shaft torque $T_g$ to the differential 50, and clutch torque $T_c$ (e.g., eLSD control clutch torque)). After block 106, the method 100 proceeds to block 108.

At block 108, the controller 34 corrects the measured longitudinal acceleration $a_x$ and the measured lateral acceleration $a_y$ using the road grade angle and the road bank angle to determine a corrected longitudinal acceleration and a corrected lateral acceleration of the vehicle 10. A time window is used to refine the measured longitudinal acceleration $a_x$ and the measured lateral acceleration $a_y$ for the transient regions and maneuvers on gravel surfaces with high fluctuations in the acceleration measurement. Then, the method 100 proceeds to block 110.

At block 110, the controller 34 determines whether the stationary condition on the corrected longitudinal acceleration, the corrected lateral acceleration, and the measured wheel speed $\omega_{ij}$ at each corner/tire of the vehicle 10 is satisfied. In other words, at block 110, if at least one of the corrected longitudinal acceleration and the corrected lateral acceleration, and the measured wheel speed $\omega_i$ of the vehicle 10 is equal to or less than respective predetermined thresholds, then the method 100 returns to block 104. On the other hand, if one or more of the corrected longitudinal acceleration, the corrected lateral acceleration, and the measured wheel speed $\omega_{ij}$ at each corner/tire of the vehicle 10 is greater than the respective predetermined thresholds, then the method 100 proceeds to block 112.

At block 112, the controller 34 forms inertia matrices based on an inertia of rotating components of the vehicle 10 (e.g., the wheels 17, the central drive shaft 12, the differential case 52 of the differential 50, the first (or right) shaft 54 interconnecting the differential 50 to one of the wheels 17, and the second (or left) shaft 56 interconnecting the differential 50 to one of the wheels 17) based on the measured wheel speed $\omega_i$ and the measured or corrected vehicle acceleration of the vehicle 10 (e.g., measured longitudinal acceleration $a_x$ and a measured lateral acceleration $a_y$, or the corrected longitudinal acceleration and the corrected lateral acceleration determined at block 108). If the differential 50 is an eLSD at the rear track of the vehicle 10, the controller 34 may employ equations (1) and (2) to calculate the inertia components of the inertia matrices:

$$\bar{I}_{in} = I_{in} + \frac{1}{n^2} I_d \qquad (1)$$

$$I_{t3} = I_{sh_L} + \frac{n^2}{4} \bar{I}_{in}, \qquad (2)$$

$$I_{t4} = I_{sh_R} + \frac{n^2}{4} \bar{I}_{in} \text{ for rear-left \& rear-right tires } 19c, 19d$$

where:
$I_d$ is the moment of inertia for differential case;
$I_{in}$ is the moment of inertia of the central drive shaft 12;
$\bar{I}_{in}$ is the moment of inertia of the input shaft (to eLSD);
$I_{t3}$, $I_{t4}$ are moments of inertia of the rear eLSD side shafts;
$I_{sh_L}$, $I_{sh_R}$ are moments of inertia of the rear-left & -right shafts from eLSD to the third and fourth wheels 17c and 17d (i.e., the first shaft 54 and the second shaft 56); and
n is the eLSD gear ratio.

As described above, the inertia matrices are formed based on inertias of: wheels 17, the differential case 52, the central drive shaft 12, and right/left shafts (i.e., the first shaft 54 and the second shaft 56) from the differential 50 (e.g., eLSD or open differential) to the third and fourth wheels 17c and 17d, among other things. Gain matrices are formed and latest high-slip conditions are incorporated for any gain update. The algorithm detects saturation condition to allocate adaptive observer gains. The threshold for saturation detection changes according to the driving conditions. At block 112, the controller 34 forms a discretized system, inertia, and input matrices (with augmented wheel speed and force states). The discretized system matrices and augmented states of the generalized force estimation structure are generated. The discretization is done by step-invariance for exact solution. After block 112, the method 100 proceeds to block 114.

At block 114, the controller 34 calculates torques at corners of the vehicle 10 using the inertia matrices. To do so, the controller 34 employs equations (3), (4), and (5):

$$T_{t_1} = -T_{b_1}, T_{t_2} = -T_{b_2} \text{ front-left \&-right tires} \quad (3)$$

$$T_{t_3} = \frac{n}{2}T_g - \frac{T_c}{2}\text{sgn}(\omega_3 - \omega_4) - I_{t_3}\dot{\omega}_3 - \frac{n^2}{4}\bar{I}_{in}\dot{\omega}_4 - T_{b_3} \quad (4)$$
rear-left tire $$T_{t_4} = \frac{n}{2}T_g + \frac{T_c}{2}\text{sgn}(\omega_3 - \omega_4) - I_{t_4}\dot{\omega}_4 - \frac{n^2}{4}\bar{I}_{in}\dot{\omega}_3 - T_{b_4} \quad (5)$$
rear-right tire where:
$T_g$ is the estimated output torque from transmission system 22 to the central drive shaft 12;
$T_c$ is estimated clutch torque of the differential clutch 58 (e.g., the eLSD clutch torque);
$\omega_3$ is the measured wheel speed of the third wheel 17c;
$\omega_4$ is the measured wheel speed of the fourth wheel 17d;
n is the eLSD gear ratio;
$I_{t_3}, I_{t_4}$ are moments of inertia of the rear eLSD side shafts;
$\bar{I}_{in}$ is the moment of inertia of the input shaft (to eLSD) inertia;
$T_{b_1}, T_{b_2}, T_{b_3}, T_{b_4}$ are the braking torque at the first tire 19a, second tire 19b, third tire 19c, and fourth tire 19d, respectively;
$T_{t_1}, T_{t_2}, T_{t_3}, T_{t_4}$ are the corner torques at the first tire 19a, second tire 19b, third tire 19c, and fourth tire 19d, respectively.

As described above, the torques at the corners of the vehicle 10 include the first corner torque $T_{t_1}$ at the first tire 19a, the second corner torque $T_{t_2}$ at the second tire 19b, the third corner torque $T_{t_3}$ at the third tire 19c, and the fourth corner torque $T_{t_4}$ at the fourth tire 19d. In view of equations (3), (4), and (5), the first corner torque $T_{t_1}$ is calculated as a function of the first brake torque $T_{b_1}$ at the first tire 19a; the second corner torque $T_{t_2}$ is calculated as a function of the second brake torque $T_{b_2}$ at the second tire 19b; the third corner torque $T_{t_3}$ is calculated as a function of the inertia matrices (e.g., the moment of inertia of the input shaft (to eLSD) inertia $\bar{I}_{in}$); and the fourth corner torque $T_{t_4}$ is calculated as a function of the inertia matrices (e.g., the moment of inertia of the input shaft (to eLSD) inertia $\bar{I}_{in}$). The corner torques are estimated by the torque generation module (block 114) based on the power transmission and actuator torques. The reconfigurable torque generation structure facilitates the application of the tire force estimator for various powertrain configurations (FWD/RWD/AWD) and actuation type (combustion engines, electric motors, open differentials, eLSD, etc.). Input matrices are formed using an approximated output torque from actuator and transmission (for example, from transmission system 22 to the central drive shaft 12 and clutch torque for the eLSD case). The developed observer with modular estimators at each corner tackles uncertainties in the estimated torques from engines, at central drive shaft 12, open differential shafts, and at eLSD clutch. After block 114, the method 100 proceeds to block 116.

At block 116, the controller 34 forms augmented state matrices by using a virtual wheel speed estimator and vehicle planar kinetics. To do so, the controller 34 may employ equations (6), (7), and (8):

$$\dot{\hat{\omega}}_i = \frac{-k_{p_i}}{I_{w_i}}\hat{\omega}_{ij} + \frac{1}{I_{w_i}}(T_{t_i} - R_{e_i}\eta_i + k_{p_i}\omega_i) \quad (6)$$
virtual wheel speed at corners $$\dot{\hat{F}}_{x_i} = \frac{k_{p_i}^2}{R_{e_i}w_i}\tilde{\omega}_i + \frac{k_{p_i}}{I_{w_i}}\left(\frac{T_{t_i} - I_{w_i}\dot{\omega}_i}{R_{e_i}} - \eta_i\right) + \mathbb{L}_i^x\tilde{y} \quad (7)$$
Longitudinal forces at corners $$\hat{F}_{y_f} = \mathbb{L}_5^y\tilde{y}, \hat{F}_{y_r} = \mathbb{L}_6^y\tilde{y} \quad (8)$$
Lateral Forces at front/rear tracks where:
$\tilde{\omega}_i = \omega_i - \hat{\omega}_i$,
$\mathbb{L}_i^x = [L_i^1 \ L_i^2 \ L_i^3], \mathbb{L}_q^y = [L_q^1 \ L_q^2 \ L_q^3]$ for $q \in \{5, 6\}$;

$$\tilde{y} = \left[a_x - \frac{\Sigma\hat{F}}{m} \ a_y - \frac{\Sigma\hat{F}}{m} \ \dot{r} - \frac{\Sigma\hat{M}_Z}{I_z}\right]^T;$$

$i \in \{1, 2, 3, 4\}$;
$\hat{\omega}_i$ is a virtual wheel speed at each corner;
$\omega_i$ is the measured wheel speed at each corner;
total torque at each corner, $T_{t_i}$, is obtained from (3)-(5);
$I_{W_i}$ is the moment of inertia of the wheels 17 (at each corner);
$R_{e_i}$ is a tire effective rolling radius;
$\eta_i$ is longitudinal force observer's internal constant (one of the input observer gains);
$k_{p_i}$ is a longitudinal force observer gains at each corner related to wheel speed (one of the input observer gains);
$\hat{\omega}_{ij}$ is the wheel speed at each corner;
m is the total vehicle mass;
$\hat{M}_z$ is the total yaw moment at vehicle CG;
$\mathbb{L}_i^x$ is the longitudinal force observer gain matrix at each corner (related to acceleration and yaw rate correction);
$\mathbb{L}_q^y$ is the lateral force observer gain matrix at each corner (related to acceleration and yaw rate correction);
$\hat{F}_{x_i}$ is estimated longitudinal tire forces at each corner/tire; and
$\hat{F}_{y_i}$ is estimated lateral tire forces at each corner/tire.

As described in the equations above, the virtual wheel speed at the corners of the vehicle is calculated as a function of the torques at the corners of the vehicle 10. At block 118, the controller 34 determines the longitudinal and lateral tire forces $\hat{F}_{x_i}, \hat{F}_{y_i}$ at the corners of the vehicle 10 as a function of the virtual wheel speed $\hat{\omega}_i$. The controller 34 estimates tire forces of the vehicle 10 based on the measured vehicle accelerations, the measured yaw rate, the measured wheel speed, and the inertia matrices at block 116.

The augmented state vector with dynamic forces may be defined as:

$$\hat{x} = [\hat{\omega}_1\hat{\omega}_2\hat{\omega}_3\hat{\omega}_4\hat{F}_{x_1}\hat{F}_{x_2}\hat{F}_{x_3}\hat{F}_{x_4}\hat{F}_{y_f}\hat{F}_{y_r}]^T \quad (9)$$

where:
$\hat{\omega}_1, \hat{\omega}_2, \hat{\omega}_2, \hat{\omega}_4$ are the virtual wheel speeds at each corner of the vehicle 10;

$\hat{F}_{x_1}$ is the estimated longitudinal tire force at the first tire 19a;

$\hat{F}_{x_2}$ is the estimated longitudinal tire force at the second tire 19b;

$\hat{F}_{x_3}$ is the estimated longitudinal tire force at the third tire 19c;

$\hat{F}_{x_4}$ is the estimated longitudinal tire force at the fourth tire 19d;

$\hat{F}_{y_f}$ is the estimated lateral tire forces at each front tires (first and second tires 19a, 19b) of the vehicle 10;

$\hat{F}_{y_r}$ is the estimated lateral tire forces at each rear tires (first and second tires 19c, 19d) of the vehicle 10; and $\hat{x}$ is the augmented state vector, which is estimated at each time step.

The direct estimator formulation with simultaneous correction/observation is defined as:

$$\dot{\hat{x}} = A_c \hat{x} + B_c \quad (10)$$

where:

$\hat{x}$ is the augmented state vector;

$A_c$ is a continuous-time state matrix; and $B_c$ is a continuous-time input matrix.

At block 116, the new augmented states and direct estimator formulation with simultaneous correction/observation are computationally efficient because of the form of the state matrix. The observation is done on the wheel speed, IMU data (acceleration and yaw rate) by using disturbance observers, wheel dynamics, and longitudinal/lateral dynamic models. The observer gain allocation defines the order of reliance on the model or on the measurements (wheel speed and acceleration). Gains changes are based on the high-slip status to avoid fluctuations (caused by nonlinearities/disturbances) during the transient regions of harsh maneuvers. After block 116, the method 100 proceeds to block 118.

At block 118, the controller 34 employs input and linear observers. The vehicle planar kinetics, wheel dynamics, and input observers at each corner (tire) are combined to ensure reliable estimation in low and high-excitation regions. Specifically, the controller 34 forms the continuous-time state matrix $A_c$ and the continuous-time state matrix $B_c$ using inertia, gain, and model input matrices as defined by equations (11)-(16):

$$A_C = \begin{bmatrix} \overline{A} & 0_{4\times 6} \\ \overline{A}_2 & \overline{A}_3 \end{bmatrix}, \mathbb{L} = \begin{bmatrix} L_1^1 & L_2^1 & L_3^1 & L_4^1 & L_5^1 & L_6^1 \\ L_1^2 & L_2^2 & L_3^2 & L_4^2 & L_5^2 & L_6^2 \\ L_1^3 & L_2^3 & L_3^3 & L_4^3 & L_5^3 & L_6^3 \end{bmatrix} \quad (11)$$

$$\overline{A} = \begin{bmatrix} -k_{p1}/I_w & 0 & 0 & 0 \\ 0 & -k_{p2}/I_w & 0 & 0 \\ 0 & 0 & -k_{p3}/I_w & 0 \\ 0 & 0 & 0 & -k_{p4}/I_w \end{bmatrix}, \quad (12)$$

$$\overline{A}_2 = \begin{bmatrix} -I_w \overline{A}^2 \\ 0_{2\times 4} \end{bmatrix}$$

-continued $$\overline{A}_{3_{j1}} = -\frac{1}{m}(\cos\delta_f L_j^1 + \sin\delta_f L_j^2) - \frac{L_j^3}{I_z}\left(\frac{W_f}{2}\cos\delta_f + l_f \sin\delta_f\right), \quad (13)$$

$$\overline{A}_{3_{j2}} = -\frac{1}{m}(\cos\delta_f L_j^1 + \sin\delta_f L_j^2) - \frac{L_j^3}{I_z}\left(\frac{-W_f}{2}\cos\delta_f + l_f \sin\delta_f\right),$$

$$\overline{A}_{3_{j3}} = -\frac{1}{m}L_j^1 - \frac{W_r}{2I_z}L_j^3,$$

$$\overline{A}_{3_{j4}} = -\frac{1}{m}L_j^1 + \frac{W_r}{2I_z}L_j^3,$$

$$\overline{A}_{3_{j5}} = \frac{1}{m}(\sin\delta_f L_j^1 - \cos\delta_f L_j^2) - \frac{l_f}{I_z}\cos\delta_f L_j^3,$$

$$\overline{A}_{3_{j6}} = -\frac{1}{m}L_j^2 + \frac{l_r}{I_z}L_j^3$$

$$B_c = \begin{bmatrix} \overline{B}_1 \\ \overline{B}_2 \\ \overline{B}_3 \end{bmatrix} \quad (14)$$

$$\overline{B}_{1_{i1}} = \frac{1}{I_{w_i}}(T_{t_i} - R_{e_i}\eta_i + k_{p_i}\omega_i) \quad (15)$$

$$\overline{B}_{2_{i1}} = \frac{k_{p_i}^2}{R_{e_i}I_{w_i}}\omega_i + \frac{k_{p_i}}{I_{w_i}}\left(\frac{T_{t_i} - I_{w_i}\dot{\omega}_i}{R_{e_i}} - \eta_i\right) + \mathbb{L}_i^x y_m \quad (16)$$

where $y_m = [a_x \ a_y \ \dot{r}]^T$

Equations (11)-(16) are the system matrices in the transformed input/output form. At block 118, the continuous-time state matrix $A_c$ and the continuous-time state matrix $B_c$ are discretized using equation (17):

$$\hat{x}_{k+1} = A_d \hat{x}_k + B_d, A_d = e^{A_c(t)T_s}, B_d = \int_0^{T_s} e^{A_c(t)\tau} B_c(t) d\tau \quad (17)$$

where:

$A_c$, $A_d$ are continuous-time and discrete-time state matrices, respectively; and $B_c$, $B_d$ are continuous-time and discrete-time input matrices, respectively.

At block 118, the controller 34 then estimates the augmented states (longitudinal and lateral forces $\hat{F}_{x_i}$, $\hat{F}_{y_i}$) and virtual wheel speeds $\hat{\omega}_i$ using the direct input observer. After block 118, the method 100 proceed to block 120.

At block 120, the controller 34 determines whether the persistence criterion on a saturation condition is satisfied. To do so, the controller 34 inspects a persistence criterion (through a time window) to remove short-term outliers and avoid incorrect gain allocation. Also, the controller 34 may detect a saturation condition (obtained by wheel speed/acceleration) and level of excitation (steering & acceleration measurements). In other words, the controller 34 determines whether the tire forces are less than or greater than maximum thresholds and minimum thresholds, respectively, on a saturation condition. If the persistence criterion is not satisfied, the controller 34 proceeds to block 122. At block 122, the controller 34 filters the tire forces at each corner. On the other hand, if the persistence criterion is satisfied, the method 100 proceeds to block 124. At block 124, the controller 34 passes the estimated virtual wheel speeds (Equation (6)) to the estimator (i.e., equations (7) and (8)). After block 124, the method 100 proceeds to block 126 and block 130.

At block 126, each corner's augmented state and system matrices are re-initialized. At block 130, the tire forces $\hat{F}_{x_i}$, $\hat{F}_{y_f}$, and $\hat{F}_{y_r}$ are determined using the equations above. After block 126, the method 100 proceeds to block 128. Each corner's longitudinal force is estimated by the direct (discretized) estimator formulation and variable observer gains is refined to have reliable estimation during large steering maneuvers or low-excitation cases, and avoid oscillations produced by harsh brake/acceleration.

At block 128, the controller 34 waits for the next sampled data (i.e., the data collected at block 106) and returns to block 106. After block 130, the method 100 proceeds to block 132. At block 132, the controller 34 controls the vehicle 10 using the longitudinal tire forces $\hat{F}_{x_i}$ or lateral tire forces $\hat{F}_{y_f}, \hat{F}_{y_r}$ (by active front/rear steering). For instance, the controller 34 may control one or more actuator devices 42 (e.g., active aerodynamic devices 60, traction/stability control systems, the propulsion system 20, the transmission system 22, the steering system 24 and/or the brake system 26) based on the estimated tire forces $\hat{F}_{x_i}$ at each corner and axle lateral forces $\hat{F}_{y_f}, \hat{F}_{y_r}$ of the vehicle 10.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An integrated method for estimation of vehicle tire force, comprising:
   receiving, by a controller of a vehicle, a measured vehicle acceleration of the vehicle, the vehicle includes an Electronic Limited Slip Differential (eLSD), and the eLSD has an eLSD gear ratio;
   receiving, by the controller, a measured wheel speed of the vehicle;
   receiving, by the controller, a measured yaw rate of the vehicle;
   forming, by the controller, inertia matrices based on an inertia of rotating components of the vehicle based on the measured wheel speed and the measured vehicle acceleration, wherein forming the inertia matrices includes calculating inertia components of the inertia matrices as a function of the eLSD gear ratio;
   calculating torques at corners of the vehicle using the inertia matrices;
   estimating tire forces of the vehicle based on the measured vehicle acceleration, the measured yaw rate, the measured wheel speed, and the inertia matrices; and
   controlling, by the controller, the vehicle, based on the plurality of estimated tire forces.

2. The method of claim 1, wherein the measured vehicle acceleration is a measured longitudinal acceleration of the vehicle, the method further comprises receiving, by the controller, a measured lateral acceleration of the vehicle, the vehicle includes a transmission system and a central drive shaft coupled between the transmission system and the eLSD, the eLSD includes a differential case, and calculating the inertia components of the inertia matrices includes calculating a moment of inertia of an input shaft to the eLSD using a following equation:

$$\overline{I}_{in} = I_{in} + \frac{1}{n^2} I_d;$$

where:
$\overline{I}_{in}$ is a moment of inertia of the input shaft to the eLSD;
$I_{in}$ is a moment of inertia of the central drive shaft;
$I_d$ is a moment of the differential case; and
n is the eLSD gear ratio.

3. The method of claim 2, further comprising receiving, by the controller, a road bank angle and a road grade angle.

4. The method of claim 3, further comprising correcting the measured longitudinal acceleration and the measured lateral acceleration using the road grade angle and the road bank angle to determine a corrected longitudinal acceleration of the vehicle and a corrected lateral acceleration of the vehicle.

5. The method of claim 4, wherein:
   the rotating components includes a plurality of wheels of the vehicle;
   the plurality of wheels includes a first wheel, a second wheel, a third wheel, and a fourth wheel;
   the eLSD includes a clutch coupled to the differential case;
   the vehicle includes a first shaft interconnecting the eLSD and the fourth wheel;
   the vehicle includes a second shaft interconnecting the eLSD and the third wheel;
   forming, by the controller, the inertia matrices includes:
      determining moments of inertia of the differential case and the clutch; and
      determining moments of inertia of the third wheel and the fourth wheel as a function of the moments of inertia of the differential case and the clutch.

6. The method of claim 5, wherein:
   the vehicle includes a plurality of tires;
   the plurality of tires includes a first tire, a second tire, a third tire, and a fourth tire;
   the torques at the corners of the vehicle include a first corner torque at the first tire, a second corner torque at the second tire, a third corner torque at the third tire, and a fourth corner torque at the fourth tire;
   the first corner torque is calculated as a function of a first brake torque at the first tire;
   the second corner torque is calculated as a function of a second brake torque at the second tire;
   the third corner torque is calculated as a function of the inertia matrices; and
   the fourth corner torque is calculated as a function of the inertia matrices.

7. The method of claim 6, further comprising estimating the virtual wheel speed at the corners of the vehicle as a function of the torques at the corners of the vehicle.

8. The method of claim 7, further comprising determining longitudinal and lateral tire forces at the corners of the vehicle as a function of the virtual wheel speed.

9. The method of claim 8, further comprising forming augmented state matrices using the virtual wheel speed at the corners of the vehicle and the longitudinal and lateral tire forces at the corners of the vehicle.

10. The method of claim 9, further comprising filtering the longitudinal and lateral tire forces at the corners of the vehicle.

11. A vehicle, comprising:
    a plurality of rotating components, wherein the plurality of rotating components includes a plurality of tires;
    a transmission system coupled to the plurality of tires;
    a plurality of sensors;
    an Electronic Limited Slip Differential (eLSD) coupled to the transmission system, the eLSD having an eLSD gear ratio;

a controller in communication with the plurality of sensors, wherein the controller is programmed to:
receive a measured vehicle acceleration of the vehicle;
receive a measured wheel speed of the vehicle;
receive a measured yaw rate of the vehicle;
form inertia matrices based on an inertia of rotating components of the vehicle based on the measured wheel speed and the measured vehicle acceleration, wherein the controller is programmed to calculate inertia components of the inertia matrices as a function of the eLSD gear ratio;
calculate torques at corners of the vehicle using the inertia matrices;
estimate tire forces of the vehicle based on the measured vehicle acceleration, the measured yaw rate, the measured wheel speed, and the inertia matrices; and
control the vehicle based on the plurality of estimated tire forces.

12. The vehicle of claim 11, wherein the measured vehicle acceleration is a measured longitudinal acceleration of the vehicle, and the controller is further programmed to receive a measured lateral acceleration of the vehicle.

13. The vehicle of claim 12, wherein the controller is further programmed to receive a road bank angle and a road grade angle.

14. The vehicle of claim 13, wherein the controller is further programmed to correct the measured longitudinal acceleration and the measured lateral acceleration using the road grade angle and the road bank angle to determine a corrected longitudinal acceleration of the vehicle and a corrected lateral acceleration of the vehicle.

15. The vehicle of claim 14, wherein:
the rotating components includes a plurality of wheels of the vehicle;
the plurality of wheels includes a first wheel, a second wheel, a third wheel, and a fourth wheel;
the vehicle includes a central drive shaft coupled to the transmission system and an Electronic Limited Slip Differential (eLSD) coupled to the central drive shaft;
the eLSD includes a differential case and a clutch coupled to the differential case;
the vehicle includes a first shaft interconnecting the eLSD and the fourth wheel;
the vehicle includes a second shaft interconnecting the eLSD and the third wheel;
the controller forms the inertia matrices by:
determining moments of inertia of the differential case and the clutch; and
determining moments of inertia of the third wheel and the fourth wheel as a function of the moments of inertia of the differential case and the clutch.

16. The vehicle of claim 15, wherein:
the plurality of tires includes a first tire, a second tire, a third tire, and a fourth tire;
the torques at the corners of the vehicle include a first corner torque at the first tire, a second corner torque at the second tire, a third corner torque at the third tire, and a fourth corner torque at the fourth tire;
the first corner torque is calculated as a function of a first brake torque at the first tire;
the second corner torque is calculated as a function of a second brake torque at the second tire;
the third corner torque is calculated as a function of the inertia matrices; and
the fourth corner torque is calculated as a function of the inertia matrices.

17. The vehicle of claim 16, wherein the controller is programmed to estimate the virtual wheel speed at the corners of the vehicle as a function of the torques at the corners of the vehicle.

18. The vehicle of claim 17, wherein the controller is programmed to determine longitudinal and lateral tire forces at the corners of the vehicle as a function of the virtual wheel speed.

19. The vehicle of claim 18, wherein the controller is programmed to form augmented state matrices using the virtual wheel speed at the corners of the vehicle and the longitudinal and lateral tire forces at the corners of the vehicle and filter the longitudinal and lateral tire forces at the corners of the vehicle.

20. The vehicle of claim 18, wherein the controller is further programmed to filter the longitudinal and lateral tire forces at the corners of the vehicle.

* * * * *